United States Patent [19]

Van Heijst

[11] 4,137,948

[45] Feb. 6, 1979

[54] INTERMEDIATE CONDUIT BETWEEN TWO PIVOTALLY CONNECTED CONDUITS

[75] Inventor: Willem J. Van Heijst, Monte-Carlo, Monaco

[73] Assignee: Single Buoy Moorings Inc., Fribourg, Switzerland

[21] Appl. No.: 832,409

[22] Filed: Sep. 12, 1977

[30] Foreign Application Priority Data

[NL] Netherlands .......................... 7705252

[51] Int. Cl.² .......................... F16L 35/00; F16L 55/00
[52] U.S. Cl. ..................................... 138/120; 138/155; 285/114; 285/223; 285/265
[58] Field of Search ............... 138/122, 150, 178, 120, 138/155; 285/114, 223, 265

[56] References Cited

U.S. PATENT DOCUMENTS

| 3,211,473 | 10/1965 | Schmid | 285/114 |
| 3,461,916 | 8/1969 | Ledgerwood | 138/120 |

FOREIGN PATENT DOCUMENTS

| 52508 | 3/1920 | Sweden | 285/265 |

*Primary Examiner*—Charles E. Phillips
*Attorney, Agent, or Firm*—Young & Thompson

[57] ABSTRACT

An intermediate conduit extends between and interconnects adjacent pivotally connected ends of a pair of conduits. The intermediate conduit is disposed in at least one turn about the pivotal interconnection, and the distance between the ends of the intermediate conduit is substantially greater than its length. A damping device such as a dashpot interconnects the intermediate conduit and one of the pair of conduits and acts in a direction parallel to the axis of the turns of the intermediate conduit.

6 Claims, 2 Drawing Figures

INTERMEDIATE CONDUIT BETWEEN TWO PIVOTALLY CONNECTED CONDUITS

This invention relates to an intermediate conduit between two pivotally connected conduits, particularly between two conduits interconnected by means of a universal joint. Intermediate conduits of this type are known in the form of hoses or pivotable tube couplings, such as universal couplings. However, hoses can be damaged; whilst high pressure universal couplings lose their flexibility. Hoses do not withstand high outer pressures at great depths below sea level.

It is an object of the present invention to provide a connection without these disadvantages. According to the invention, this is achieved in that the intermediate conduit consists of rigid elastic material, the ends of which are displaced with respect to each other and connected each to a different one of the pair of conduits, the length of the intermediate conduit being substantially greater than the distance between the points of connection of the intermediate conduit to the pair of conduits. The intermediate conduit is coupled with the damping device at at least one point between those points of connection.

The intermediate conduit of rigid elastic material acts as a spring and hence provides a connection permitting the motion of the pivotally interconnected pair of conduits with respect to each other without such problems occurring as are inherent in hose couplings or pivotal pipe joints. Such an intermediate conduit is intended for use with a pivotal connection between two conduits at great depths below sea level.

In practice, such an intermediate conduit may be subjected to heavy vibration under the influence of water currents and the relative movements of the pair of pivotally interconnected conduits. Such vibrations may occur in all possible directions. The rupture of such a conduit leads to serious consequences owing to the emission of large quantities of the fluid flowing through the conduit. Repair is also difficult. These conduits have a high flow capacity, as a result of which the intermediate conduit will be large. But due to the presence of the damping device of the present invention, the risk of damage is avoided.

With elastically interconnected parts, it is known that undesirable vibrations of one part with respect to the other are diminished by connecting at least one of the parts with a damping device. However, according to the present invention, the intermediate conduit which itself acts as a spring, is what is coupled to the damping device.

In the case of an intermediate conduit forming at least one complete turn, the ends of which are axially and/or radially displaced with respect to each other, the damping device may consist of at least a damping cylinder whose working direction is substantially parallel to the axis of the turn.

It has been found that, as a result of the damping of the vibrations in an axial direction, vibrations in other directions are likewise damped.

The damping device of the present invention can in its simplest form comprise a shock absorber and may, for example, consist of an open cylinder, in which a piston is disposed, said damping device being connected on the one hand with one of the pair of conduits and on the other hand with the intermediate conduit. The regions within the cylinder on either side of the piston intercommunicate via gaps between the piston and the cylinder wall, or via flow passages in the piston, or via flow channels interconnecting the spaces. However, these spaces need not intercommunicate if the cylinder wall at the end that is closed by the piston, is provided with at least one opening therethrough.

Because the device is submerged, and the cylinder is open, the cylinder fills with water. The resistance to the flow of water either past or through the piston or through the cylinder wall, provides the damping action.

Other objects, features and advantages of the present invention will become apparent from a consideration of the following description, taken in connection with the accompanying drawing, in which.

Figure 1:
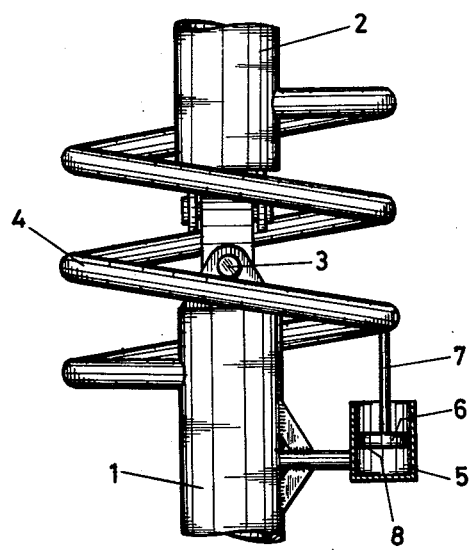
FIG. 1 shows a device according to the invention, with parts in section.

Referring now to the drawing in greater detail, and first to FIG. 1 thereof, there is shown a pair of conduits 1 and 2 whose adjacent closed ends are coupled together by a universal joint 3. Communication for fluid flow between conduits 1 and 2 is provided by means of an intermediate conduit 4, for example of resilient steel, disposed in a helix comprised by a plurality of turns. The opposite ends of conduit 4 are secured to and communicate with the interior of conduits 1 and 2, respectively.

Secured to conduit 1 is an open cylinder 5 with a piston 6 therein, the latter being mechanically connected with the intermediate conduit 4 by means of a piston rod 7. Between the cylinder wall and the piston, flow passages are schematically indicated in the form of a clearance 8.

The rod 7 and the direction of movement of rod 7 and piston 6 relative to cylinder 5, are parallel to the axis of intermediate conduit 4.

Vibrations of the intermediate conduit are now slowed down by this damping device, as a result of which the risk of rupture of the intermediate conduit is avoided.

Figure 2:
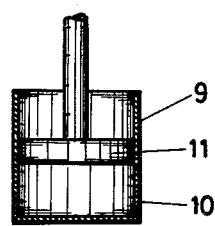
FIG. 2 is a sectional view through another embodiment of the damping device.

FIG. 2 shows, as an alternative embodiment to the damping device of FIG. 1, an open cylinder 9 with a slidably fitting piston 11. Cylinder 9 and piston 11 are mounted on the conduit 1 or conduit 4 in the same manner as in FIG. 1. Under the piston 11, that is, in that portion of cylinder 9 that is closed by piston 11, there is an opening 10 through the cylinder wall. Preferably, means (not shown) are provided for adjusting the flow of fluid through opening 10, thereby to determine the degree of damping. It will of course be understood that in the FIG. 2 embodiment, the water moves in and out of the cylinder only through opening 10, thereby to damp what would otherwise be vibrations in intermediate conduit 4.

From a consideration of the foregoing disclosure, therefore, it will be evident that the initially recited object of the present invention has been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In combination, a pair of conduits pivotally interconnected so as to allow pivotal movement of one conduit with respect to the other but prevent any other respective movement, a rigid elastic intermediate conduit which at one end is secured to and communicates with the interior of one of said conduits and at its other end is secured to and communicates with the interior of the other of said conduits, the straight line distance between the ends of the intermediate conduit being substantially less than the length of the intermediate conduit, and damping means extending between one of said pair of conduits and said intermediate conduit at at least one point on said intermediate conduit spaced between the ends of said intermediate conduit.

2. Apparatus as claimed in claim 1, in which said intermediate conduit comprises at least one complete turn, said damping device acting in a direction parallel to the axis of said at least one turn.

3. Apparatus as claimed in claim 2, in which said damping device comprises a cylinder and a piston movable in said cylinder in a direction parallel to said axis.

4. Apparatus as claimed in claim 3, there being at least one passage for the flow of fluid from said cylinder past said piston.

5. Apparatus as claimed in claim 3, said cylinder and piston enclosing between them a space which communicates with the outside of the cylinder only through at least one opening through the cylinder.

6. Apparatus as claimed in claim 1, wherein said pivotal connection is performed by a universal joint interconnecting said pair of conduits, said intermediate conduit communicating between the interior of said pair of conduits in bypass relationship about said universal joint.

* * * * *

UNITED STATES PATENT AND TRADEMARK OFFICE
CERTIFICATE OF CORRECTION

PATENT NO. : 4,137,948
DATED : Feb. 6, 1979
INVENTOR(S) : Willem J. VAN HEIJST

It is certified that error appears in the above—identified patent and that said Letters Patent are hereby corrected as shown below:

In the Heading of the patent, item [30] should read as follows:

--[30] FOREIGN APPLICATION PRIORITY DATA

July 26, 1977 [NL] Netherlands........... 7708282--

Signed and Sealed this

Seventeenth Day of July 1979

[SEAL]

Attest:

Attesting Officer

LUTRELLE F. PARKER
*Acting Commissioner of Patents and Trademarks*